(12) United States Patent
Schwarz et al.

(10) Patent No.: US 10,815,889 B2
(45) Date of Patent: Oct. 27, 2020

(54) FAILURE MITIGATION AND FAILURE DETECTION OF INTERCOOLED COOLING AIR SYSTEMS

(71) Applicant: United Technologies Corporation, Farmington, CT (US)

(72) Inventors: Frederick M. Schwarz, Glastonbury, CT (US); Jorn Axel Glahn, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 340 days.

(21) Appl. No.: 16/027,787

(22) Filed: Jul. 5, 2018

(65) Prior Publication Data

US 2020/0011247 A1 Jan. 9, 2020

(51) Int. Cl.
*F02C 7/14* (2006.01)
*F02C 3/04* (2006.01)
(Continued)

(52) U.S. Cl.
CPC ............... *F02C 7/14* (2013.01); *F02C 3/04* (2013.01); *F02C 7/18* (2013.01); *G07C 5/006* (2013.01); *F05D 2220/323* (2013.01); *F05D 2260/213* (2013.01); *F05D 2260/40* (2013.01); *F05D 2260/80* (2013.01); *F05D 2270/053* (2013.01); *F05D 2270/301* (2013.01); *F05D 2270/303* (2013.01)

(58) Field of Classification Search
CPC ...... F02C 6/08; F02C 7/18; F02C 3/04; F02C 7/185; F02C 9/18; F02C 7/14; B64D 2013/0618; F02K 3/115; F05D 2220/323; F05D 2260/213; F05D 2260/40; F05D 2270/053; F05D 2270/301; F05D 2270/303; F05D 2260/80; G07C 5/006
See application file for complete search history.

(56) References Cited

U.S. PATENT DOCUMENTS 7,810,312 B2 10/2010 Stretton et al.
8,307,662 B2 11/2012 Turco
(Continued)

OTHER PUBLICATIONS

Extended European Search Report dated Nov. 21, 2019, received for corresponding European Application No. 19184263.2, 8 pages.

*Primary Examiner* — Tuan C To
*Assistant Examiner* — Paula A Castro
(74) *Attorney, Agent, or Firm* — Kinney & Lange, P.A.

(57) ABSTRACT

A gas turbine engine includes a first tap connected to a compressor section to deliver air at a first pressure. A heat exchanger is downstream of the first tap. A cooling air valve selectively blocks flow of cooling air across the heat exchanger. A cooling compressor is downstream of the heat exchanger and pressurizes the air from the first tap to a greater second pressure. A shut off valve selectively stops flow of the air between the heat exchanger and the cooling compressor. A controller controls the cooling air valve, the shut off valve, and the cooling compressor such that the flow of the air is stopped between the heat exchanger and the cooling compressor only after the controller has stopped the cooling compressor. A monitoring system communicates with the controller and includes a pressure sensor and a temperature sensor downstream of the cooling compressor.

19 Claims, 6 Drawing Sheets

(51) Int. Cl.
*F02C 7/18* (2006.01)
*G07C 5/00* (2006.01)

(56) References Cited

U.S. PATENT DOCUMENTS

| | | |
|---|---|---|
| 8,789,376 B2 | 7/2014 | Coffinberry |
| 9,303,526 B2 | 4/2016 | Chir et al. |
| 9,885,251 B2 | 2/2018 | Lebel et al. |
| 2013/0133334 A1* | 5/2013 | Strecker .............. F02C 7/18 60/782 |
| 2015/0166187 A1* | 6/2015 | Durbin ................ B64D 13/08 62/79 |
| 2017/0167388 A1 | 6/2017 | Merry et al. |
| 2017/0234227 A1 | 8/2017 | Kraft |
| 2018/0051628 A1 | 2/2018 | Roberge |
| 2018/0073431 A1 | 3/2018 | Smith et al. |
| 2018/0080383 A1 | 3/2018 | Snape |
| 2018/0128176 A1 | 5/2018 | Staubach et al. |
| 2018/0128178 A1 | 5/2018 | Snape et al. |
| 2018/0128179 A1 | 5/2018 | Staubach et al. |

\* cited by examiner

FAILURE MITIGATION AND FAILURE DETECTION OF INTERCOOLED COOLING AIR SYSTEMS

BACKGROUND

The present disclosure relates to turbine cooling systems in gas turbine engines.

A gas turbine engine on an aircraft typically includes a fan section, a compressor section, a combustor section and a turbine section. Air entering the compressor section is compressed and delivered into the combustor section where it is mixed with fuel and ignited to generate a high-speed exhaust gas flow. Prior to entry into the combustor section, the compressed air exiting the compressor section may have a high temperature and may be traveling at a high velocity. In order to guide the air to the combustor, as well as to reduce the velocity of the compressed air and to condition it for combustion, the gas turbine engine may also include a diffuser case. After exiting the combustor, the high-speed exhaust gas flow expands through the turbine section to drive the compressor and the fan section. The high-speed exhaust gas flow in the turbine section has a high temperature and cooling of the components in the turbine section is required to reduce corrosion in the turbine section and to extend the life of the turbine section. Cooling in the turbine section is especially important during takeoff of the aircraft, takeoff being the hottest portion of the mission of the gas turbine engine.

Many gas turbine engines cool the turbine section by bleeding cooling flow from the compressor section or the diffuser case, and then supplying the flow to the turbine section. Modern gas turbine engines are operating at increasingly higher compressor pressures, and hence, cooling air temperatures. In the turbine section the gas path is also being exposed to higher temperatures and pressures. Ensuring that adequate cooling air is delivered efficiently to the turbine section and portions of the compressor section is important for maintaining and extending the service life of the components of those sections in these higher temperatures and pressures.

SUMMARY

In one aspect of the invention, a gas turbine engine includes a plurality of rotating components housed within a main compressor section and a turbine section. A first tap is connected to the main compressor section and is configured to deliver air at a first pressure. A heat exchanger is connected downstream of the first tap. A bypass air valve is configured to selectively block flow of bypass air across the heat exchanger, wherein the bypass air is lower in temperature and pressure than the air from the first tap at the first pressure. A cooling compressor is connected downstream of the heat exchanger and is configured to pressurize the air from the first tap to a second pressure that is greater than the first pressure. A shut off valve is configured to selectively stop flow of the air through the heat exchanger and the cooling compressor. A controller is configured to modulate and stop flow between the heat exchanger and the plurality of rotating components under certain power conditions of the gas turbine engine. The controller is programmed to control the bypass air valve, the shut off valve, and the cooling compressor such that the flow of the air is stopped between the heat exchanger and the cooling compressor only after the controller has stopped the cooling compressor. A monitoring system is in communication with the controller and includes at least one of a pressure sensor downstream of the cooling compressor, and a temperature sensor downstream of the cooling compressor.

In another aspect of the invention, a gas turbine engine includes a plurality of rotating components housed within a main compressor section and a turbine section. A first tap is connected to the main compressor section and is configured to deliver air at a first pressure. A heat exchanger is connected downstream of the first tap. A cooling air valve is configured to selectively block flow of cooling air across the heat exchanger. A cooling compressor is connected downstream of the heat exchanger and is configured to pressurize the air from the first tap to a second pressure that is greater than the first pressure. A shut off valve is configured to selectively stop flow of the air between the heat exchanger and the cooling compressor. A controller is configured and programmed to control the cooling air valve, the shut off valve, and the cooling compressor such that the flow of the air is intentionally stopped between the heat exchanger and the cooling compressor only after the controller has stopped the cooling compressor. A monitoring system is in communication with the controller and includes a pressure sensor downstream of the cooling compressor, and a temperature sensor downstream of the cooling compressor.

Persons of ordinary skill in the art will recognize that other aspects and embodiments of the present invention are possible in view of the entirety of the present disclosure, including the accompanying figures.

Figure 1:
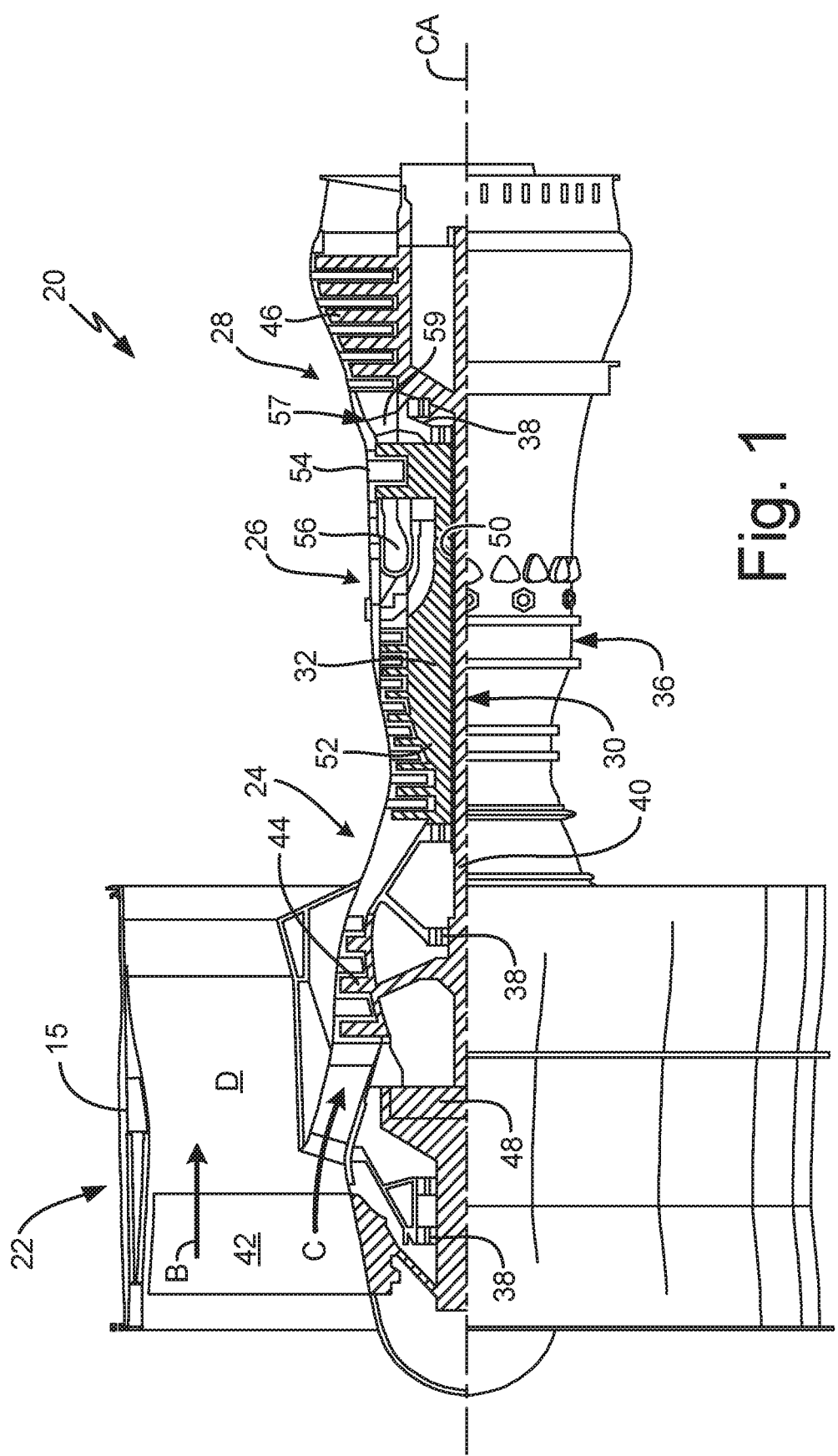
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides an intercooled cooling system for providing a boosted cooling air supply that can be modulated during operation of a gas turbine engine. The intercooled cooling system provides additional cooling air when the gas turbine engine is operating at peak levels, such as during lift and climb. The intercooled cooling system can be powered down when the gas turbine engine is operating below peak levels, such as during cruise or idle. The intercooled cooling system includes a health monitoring system that can detect and mitigate performance errors in the intercooled cooling system and instigate action to protect the gas turbine engine from overheating.

FIG. 1 is a quarter-sectional view that schematically illustrates example gas turbine engine 20 that includes fan section 22, compressor section 24, combustor section 26 and turbine section 28. Fan section 22 drives air along bypass flow path B in bypass duct D while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Although the disclosed non-limiting embodiment depicts a turbofan gas turbine engine, it should be understood that the concepts described herein are not limited to use with turbofans as the teachings may be applied to other types of turbine engines including three-spool architectures.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor 44 to low pressure (or first) turbine 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor 52 and high pressure (or second) turbine 54. Inner shaft 40 and outer shaft 50 are concentric and rotate via bearing assemblies 38 about center axis CA.

Combustor 56 is arranged between high pressure compressor 52 and high pressure turbine 54. Mid-turbine frame 57 of engine static structure 36 can be arranged generally between high pressure turbine 54 and low pressure turbine 46. Mid-turbine frame 57 further supports bearing assemblies 38 in turbine section 28 as well as setting airflow entering the low pressure turbine 46. Mid-turbine frame 57 includes airfoils 59 which are in core flow path C. The air in core flow path C is compressed first by low pressure compressor 44 and then by high pressure compressor 52. Next, the air is mixed with fuel and ignited in combustor 56 to produce high speed exhaust gases that are then expanded through high pressure turbine 54, mid-turbine frame 58, and low pressure turbine 46. The high speed exhaust gases have an extremely high temperature as they enter high pressure turbine 54 from combustor 56. The air in core flow path C at the exit of high pressure compressor 52 also has a relatively high temperature due to the high pressure of the air exiting high pressure compressor 52. As discussed below with reference to FIG. 2A, intercooled cooling system 60 provides pressurized cooling air to high pressure turbine 54 and high pressure compressor 52 to cool and protect the components of high pressure turbine 54 and high pressure compressor 52 against thermal degradation and corrosion.

Figure 2A:
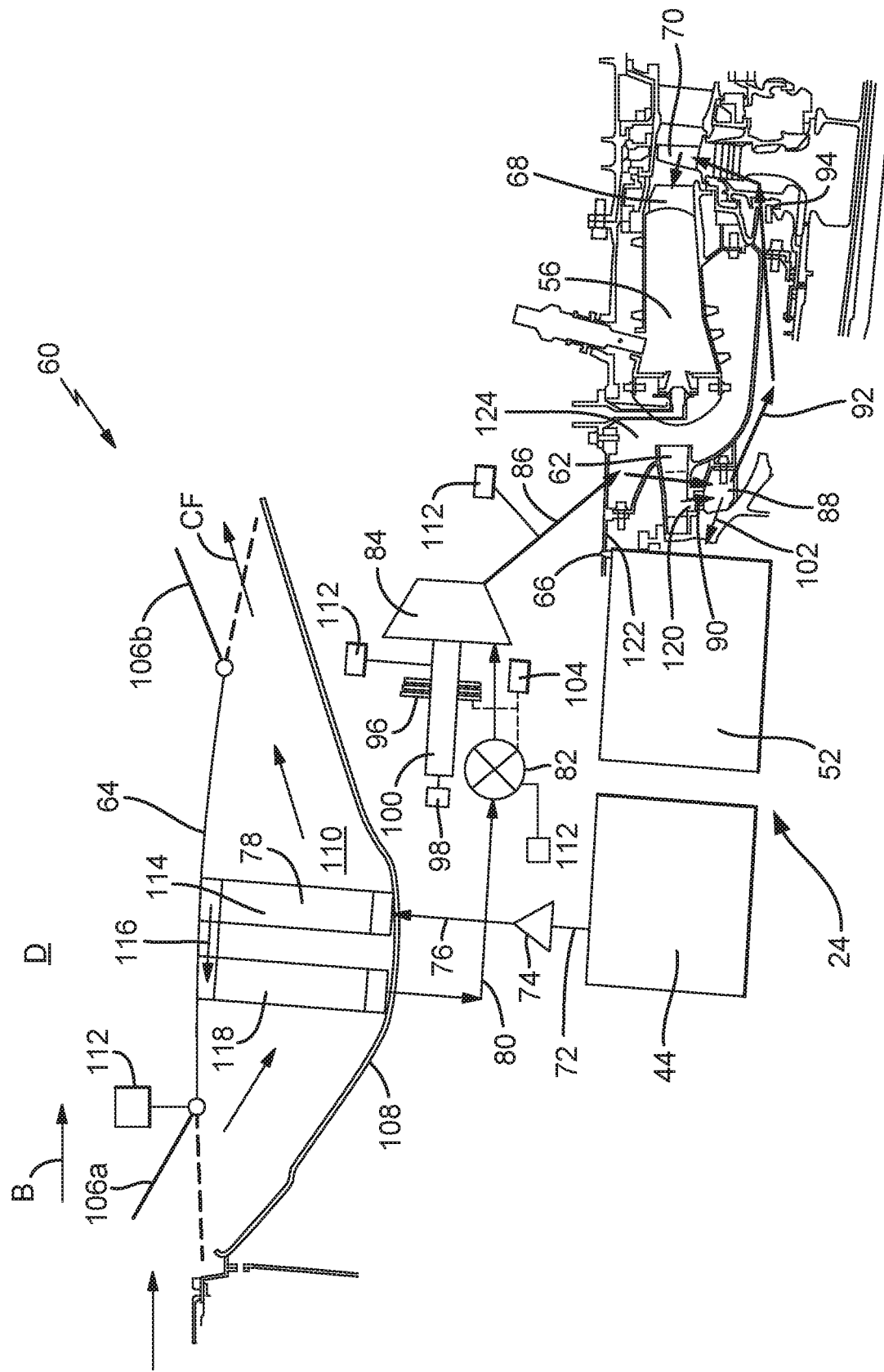
FIG. 2A is a schematic diagram of an intercooled cooling system for the gas turbine engine of FIG. 1.
Figure 2B:
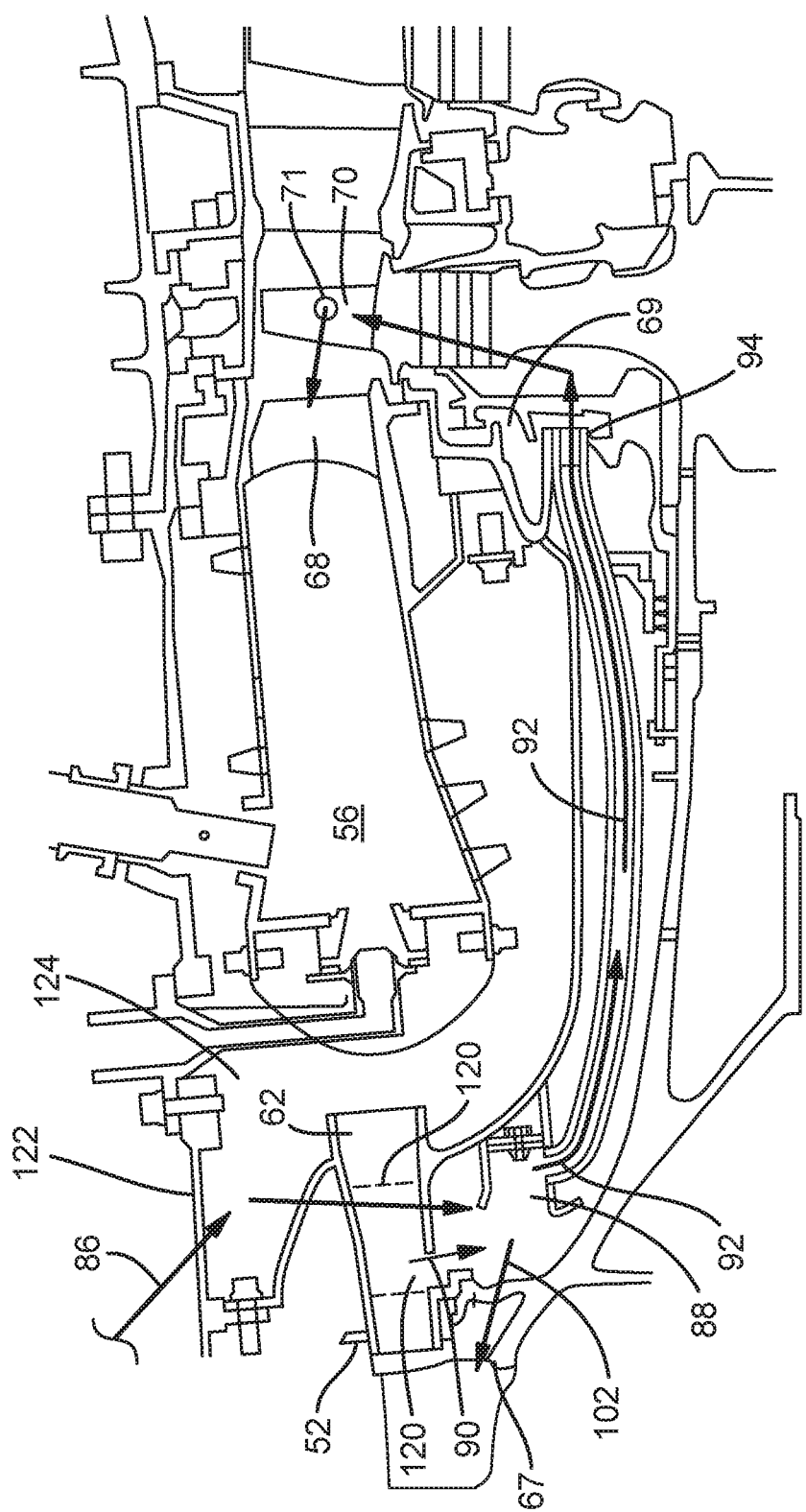
FIG. 2B is an enlarged view of a mixing chamber of the intercooled cooling system, a diffuser case, a tangential on-board injector (TOBI), a combustor section, and a high-pressure turbine section taken from in FIG. 2A.

FIGS. 2A and 2B will be discussed concurrently. FIG. 2A is a schematic diagram of low pressure compressor 44, high pressure compressor 52, high pressure turbine 54, combustor 56, bypass duct D, and intercooled cooling system 60 for gas turbine engine 20 (shown in FIG. 1). FIG. 2B is an enlarged view from FIG. 2A of high pressure turbine 54, combustor 56, and diffuser 62. As shown in FIG. 2A, gas turbine engine 20 also includes core engine housing 64. As shown between FIGS. 2A and 2B, high pressure compressor 52 includes downstream exit 66 and disc 67. High pressure turbine 54 includes first turbine vane row 68, disc and hub 69, first turbine blade row 70, and cooling holes 71. Intercooled cooling system 60 includes first tap 72, check valve 74, passage 76, heat exchanger 78, line 80, shut off valve 82, cooling compressor 84, passages 86, mixing chamber 88, second tap 90, passages 92, and tangential on-board injector (TOBI) 94. Intercooled cooling system 60 also includes clutch 96, drive input 98, shaft 100, an optional compressor on-board injector (COBI) 102 which is a row of turning vanes intended to pre-swirl airflow onto a rotor, controller 104, cooling air valve 106a/106b, cooling air CF, inner housing 108, intermediate chamber 110, and monitoring system 112. Heat exchanger 78 includes first leg 114, crossing portion 116, and return leg 118. Diffuser 62 includes structural struts 120, diffuser casing 122, and diffuser chamber 124. While tap 72, passage 76, line 80, passages 86, and passages 92 are shown as simple lines it should be understood they are fluid conduits.

Core engine housing 64 is defined inwardly of bypass duct D and outwardly of compressor section 24. Inner housing 108 is also outwardly of low pressure compressor 44 and high pressure compressor 52. Intermediate chamber 110 is defined between core engine housing 64 and inner housing 108. An upstream end and a downstream end of intermediate chamber 110 fluidically communicate with bypass duct D to allow a flow of low pressure cooling air CF to enter intermediate chamber 110. Heat exchanger 78 of intercooled cooling system 60 is located inside intermediate chamber 110 so that heat exchanger 78 does not block bypass duct flow B in bypass duct D.

Downstream exit 66 of high pressure compressor 52 defines a location where the air compressed by compressor section 24 is at, or about at the highest pressure to be seen in the core of gas turbine engine 20. The pressure of the compressed air at downstream exit 66 is referred to as pressure $P_3$. Further, air downstream of downstream exit 66 is at about the highest temperature (known as temperature $T_3$) seen in the core of gas turbine engine 20 before the air is combusted, and may also surround combustor 56. Therefore $P_3$ is the highest pressure seen in the core engine to be used as cooling air and the air at $P_3$ is at the high temperature $T_3$. Diffuser 62 is downstream of high pressure compressor 52 with diffuser casing 122 and diffuser chamber 124 at least partially enclosing combustor 56 and the air within it is at about pressure $P_3$ and temperature $T_3$. Structural struts 120 of diffuser 62 support the inner annular structure of diffuser casing 122 that surrounds the inner part of combustor 56, and guide the flow of compressed air from downstream exit 66 of high pressure compressor 52.

Optionally, conditioned air from the intercooled cooling system 60 may cool at least a part of first turbine vane row 68, first turbine blade row 70, and disk and hub 69 of high pressure turbine 54. In addition, or alternatively, the air may also cool a disk and hub 67 of at least a final downstream stage in high pressure compressor 52.

Air is bled through first tap 72 at a location which is upstream of downstream exit 66 of high compressor 52. The pressure and temperature of the air at first tap 72 are both at an intermediate pressure and temperature that is lower than the pressure $P_3$ and temperature $T_3$ at downstream exit 66 and higher than the low pressure and temperature air in bypass duct D that is flowing through heat exchanger 118. In the illustrated embodiment of FIG. 2A, first tap 72 bleeds air from low pressure compressor 44 at a pressure that is lower than the pressure $P_3$ at downstream exit 66. However, in alternative embodiments, first tap 72 may also bleed air at more downstream locations in low pressure compressor 44, or at locations within high pressure compressor 52 that are upstream of downstream exit 66. First tap 72 directs the air through check valve 74. Check valve 74 ensures that the air flowing from first tap 72 will only pass into passage 76 and will not return into compressor section 24.

The arrangement of check valve 74, shut off valve 82, and cooling compressor 84 in FIG. 2A is such that shut off valve 82 sees cool air. However, the placement of check valve 74 can be interchanged with shut off valve 82.

Air downstream of passage 76 passes into first leg 114 of heat exchanger 78. First leg 114 directs the air outward to crossing portion 116. Crossing portion 116 then directs the air axially forward to return leg 118. Return leg 118 of heat exchanger 78 directs the air back inwardly through inner housing 108 to line 80. While heat exchanger 78 is shown schematically, it should be understood that a plurality of heat exchange enhancing features such as fins, etc. may be utilized on the outer surface of the heat exchanger 78 to increase heat transfer. In addition, a plurality of legs 114/118 may be utilized with a single return manifold 116. As can be seen, the radially outwardly extending first leg 114 is located within intermediate chamber 110 to be downstream (relative cooling air flow CF) of return leg 118. In this manner, the air in return leg 118, which is cooler than the air in first leg 114, is cooled before the cooling air encounters the higher temperature air in first leg 114. It should be understood that the arrangement shown for heat exchanger 78 is a space saving arrangement which might facilitate packaging of an otherwise very large pneumatic system in the core. Other heat exchanger arrangements can be employed within the scope of the invention.

Air downstream of line 80 passes through shut off valve 82. The air downstream of shut off valve 82 passes to cooling compressor 84. The air downstream of cooling compressor 84 passes into passages 86, and through structural struts 120 of diffuser 62. After passing through structural struts 120, the air enters mixing chamber 88 radially inward of diffuser 62. Second tap 90 is fluidically connected to mixing chamber 88 and allows air from downstream exit 66 and/or diffuser 62 to enter mixing chamber 88 and mix with the air from cooling compressor 84. While cooling compressor 84 is operating, the cold air from heat exchanger 78 and cooling compressor 84 drives the air in mixing chamber 88 to a low temperature because that flow deters the flow from second tap 90 from entering mixing chamber 88. When cooling compressor 84 stops and shut off valve 82 is closed, then only the flow from second tap 90 is available to feed mixing chamber 88 and the downstream air sinks in the compressor and the turbine.

As previously discussed, the air from downstream exit 66 and diffuser 62 is at pressure $P_3$, which is higher than the pressure of the air at first tap 72. The air from cooling compressor 84 has a pressure greater than or equal to pressure $P_3$, and a temperature lower than temperature $T_3$. Cooling compressor 84 may be designed such that cooling compressor 84 compresses air to a pressure slightly greater than pressure $P_3$ at downstream exit 66. For example, the pressure ratio between the air just downstream of cooling compressor 84 and the air at pressure $P_3$ may be greater than 1.02, and in other examples greater than 1.05. Also, mixing chamber 88 has no moving parts, thus the flow of air supplied to mixing chamber 88 by cooling compressor 84 can potentially be supplemented by flow from second tap 90, or lost through second tap 90 if cooling compressor 84 provides an oversupply of air relative to what all passages downstream of mixing chamber 88 can receive.

As best shown in FIG. 2B, after mixing in mixing chamber 88, the mixed air passes downstream of mixing chamber 88 through passages 92, then through tangential on-board injector 94 or TOBI 94, and then to first turbine blade row 70 and first turbine vane row 68. Cooling holes 71 are formed in turbine blades 70 to deliver the cooling air to the immediate front of each turbine blade 70 and along the concave sides and convex sides of each turbine blade 70 where hot gases leaving vanes 68 have a maximum scrubbing effect on turbines blades 70. The cooling airflow can also be delivered to the front side of disk and hub 69 such that the cavity there is purged with cooling air and flow recirculation of very hot gases from the turbine gaspath between vanes 68 and blades 70 is reduced in temperature to an acceptable level. A portion of the mixed air can also be passed through COBI 102 to cool the hub and disk 67 of high pressure compressor 52.

As further shown in FIG. 2A, clutch 96 selectively connects drive input 98 through shaft 100 to drive cooling compressor 84. The term clutch is used here to describe a shaft drive disconnection device of any kind that can sever the connection of cooling compressor 84 to gas turbine engine 20. Alternatively, a motor can be used to drive cooling compressor 84 and in that embodiment cooling compressor 84 is simply shut off by removing the electricity or hydraulic power from that device. Drive input 98 may be a mechanical power take off shaft, an electric or hydraulic motor, or any number of other drives. One feature of this disclosure is that intercooled cooling air passing through cooling compressor 84 is optionally only utilized at higher power operation for gas turbine engine 20. As an example, clutch 96 can be disengaged such that cooling compressor 84 is not powered during idle, at the end of climb, or during cruise operation of gas turbine engine 20. However, at takeoff and initial climb, clutch 96 engages drive input 98 with shaft 100 so that cooling compressor 84 supplements the cooling air provided to first turbine blade row 70, first turbine vane row 68, and the final stage (not shown) of high pressure compressor 52. Clutch 96 is opened (moved to a disengaged position) by controller 104 to stop rotation of cooling compressor 84 under conditions as described above. Controller 104 also selectively opens and closes shut off valve 82. Controller 104 is programmed and/or configured to open clutch 96 and shutdown cooling compressor 84 before closing shut off valve 82 to block further airflow. In an alternative embodiment, controller 104 can shutdown cooling compressor 84 by stopping the power of drive input 98. Other shut off controls to depower cooling compressor 84 from compressing air may be used. Controller 104 may be part of a FADEC for gas turbine engine 20, or a stand-alone control programmed as appropriate.

Controller 104 can also control cooling air valve 106a/106b. Cooling air valve 106a/106b controls cooling air CF that enters intermediate chamber 110 from bypass duct D to cool heat exchanger 78. Low pressure air cooling air valves at either or both 106a and/106b can be selectively opened and closed by controller 104 to reduce or eliminate cooling air CF from flowing across heat exchanger 78. The benefit of doing so is to reduce or eliminate the flow taken from bypass duct D such that increased engine thrust is realized by eliminating the pressure loss incurred in sending flow through heat exchanger 78 unnecessarily. Generally, when gas turbine engine 20 is at lower power operation, cooling air valves at 106a/106b is closed after cooling compressor 84 is shutdown. Closing cooling air valve 106a/106b when cooling compressor 84 is off improves engine efficiency and thrust by decreasing the amount of bypass flow B diverted through intermediate chamber 110. Cooling air valve 106a can be positioned at an upstream end of intermediate chamber 110, or cooling air valve 106b can be positioned at a downstream end of intermediate chamber 110, relative bypass flow B. Intermediate chamber 110 can include a flush scoop (not shown) at the upstream end if cooling air valve 106b is positioned at the downstream end of intermediate chamber 110.

Monitoring system 112 monitors cooling air valve 106a/106b, shut off valve 82, clutch 96, and the pressure and temperature of the air exiting cooling compressor 84. As discussed below in greater detail below, monitoring system 112 and controller 104 work together to maintain the life and operability of intercooled cooling system 60 and gas turbine engine 20.

Figure 2C:
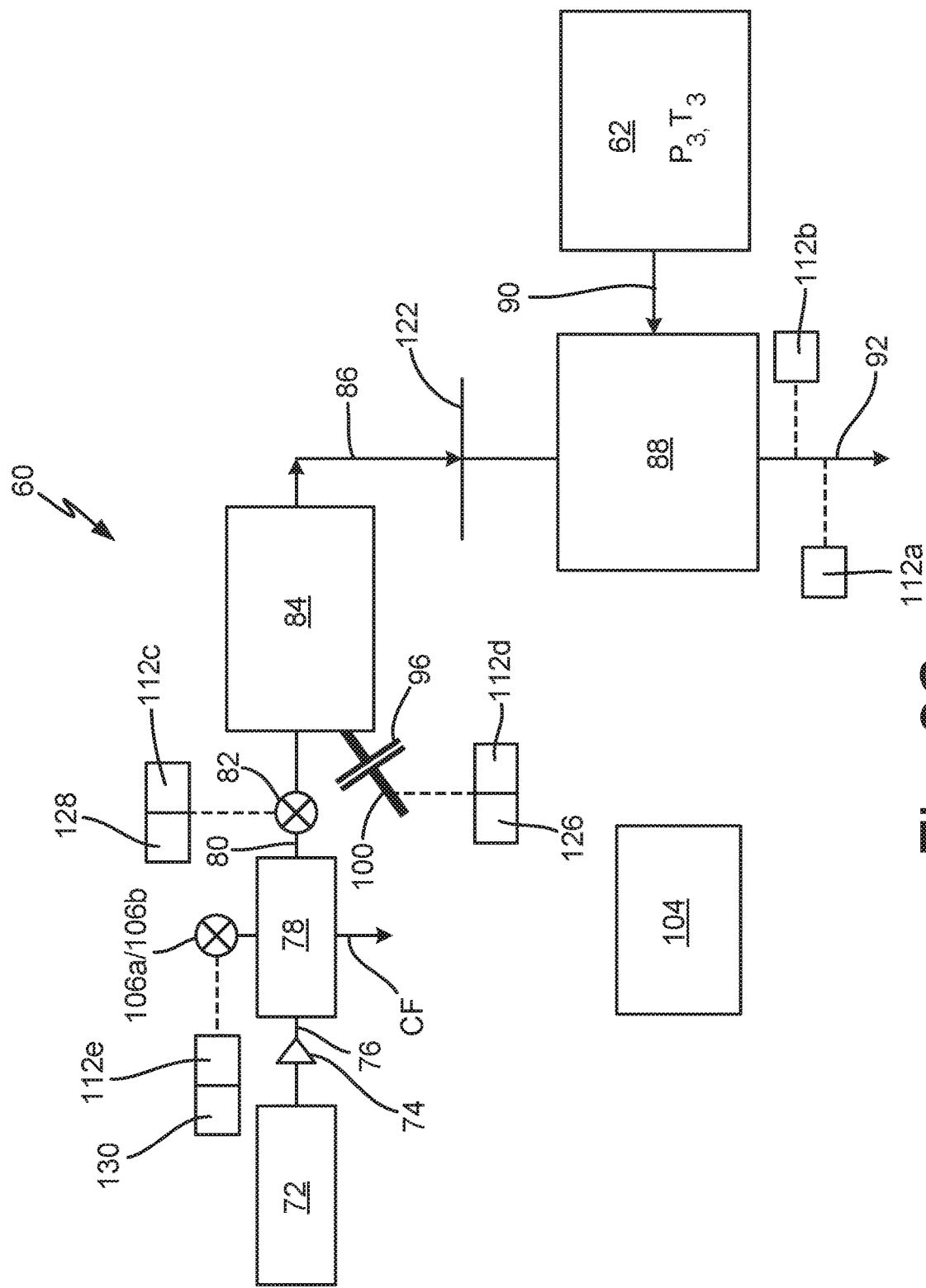
FIG. 2C is a schematic diagram of the intercooled cooling system from FIG. 2A.

FIG. 2C is a schematic diagram of intercooled cooling system 60. In addition to the components of intercooled cooling system 60 described above with reference to FIGS. 2A and 2B, intercooled cooling system 60 further includes clutch actuator 126, shut-off-valve actuator 128, and cooling-air-valve actuator 130. Monitoring system 112 includes pressure sensor 112a, temperature sensor 112b, first position sensor 112c, second position sensor 112d, and third position sensor 112e.

Clutch actuator 126 controls the position of clutch 96 and moves clutch 96 to an open position (to cut power to cooling compressor 84) and/or a closed position (to supply power to cooling compressor 84). Controller 104 communicates with clutch actuator 126 to control clutch 96. Clutch 96 and clutch actuator 126 can be configured such that clutch 96 moves to the closed position when power is applied to clutch actuator 126, and clutch 96 automatically moves to the open position when no power is applied to clutch actuator 126. Thus, if clutch actuator 126 were to fail and lose power, clutch 96 would automatically move to the open position and remove power from cooling compressor 84.

Shut-off-valve actuator 128 opens and closes shut off valve 82. Controller 104 also communicates with shut-off-valve actuator 128 and controls shut off valve 82. Shut off valve 82 and shut-off-valve actuator 128 can be configured such that shut off valve 82 closes when power is applied to shut-off-valve actuator 128, and a spring (not shown) or some other latent mechanism opens shut off valve 82 when power is removed from shut-off-valve actuator 128. In the event that shut-off-valve actuator 128 fails and loses power, shut off valve 82 will automatically open.

Cooling-air-valve actuator 130 opens, closes, and modulates cooling air valve 106a/106b. Controller 104 also communicates with and controls cooling-air-valve actuator 130. Cooling air valve 106a/106b and cooling-air-valve actuator 130 can be configured such that cooling air valve 106a/106b closes when power is applied to cooling-air-valve actuator 130, and cooling air valve 106a/106b automatically opens via a spring or some other latent mechanism when power is cut to cooling-air-valve actuator 130. Clutch actuator 126, shut-off-valve actuator 128, and cooling-air-valve actuator 130 can each be an electro-mechanical actuator that communicates electrically with controller 104 and that is adapted to perform their required functions. Clutch actuator 126, shut-off-valve actuator 128, and cooling-air-valve actuator 130 can also be mechanical actuators that communicate mechanically with controller 104.

Pressure sensor 112a and temperature sensor 112b are both positioned within intercooled cooling system 60 at a location downstream of cooling compressor 84 and upstream from high pressure turbine 54 (shown in FIG. 1). For example, pressure sensor 112a and temperature sensor 112b can be placed in mixing chamber 88 to monitor the pressure and the temperature within mixing chamber 88. Pressure sensor 112a and temperature sensor 112b both communicate with controller 104 and provide to controller 104 pressure and temperature data regarding the air downstream from cooling compressor 84 in intercooled cooling system 60.

First position sensor 112c is located at shut off valve 82 and monitors the position of shut off valve 82. First position sensor 112c also communicates with controller 104 and tells controller 104 if shut off valve 82 is closed or open. Second position sensor 112d is located at clutch 96 and monitors the position and/or speed of clutch 96. Second position sensor 112d communicates with controller 104 and tells controller 104 if clutch 96 is in the open position or the closed position. Third position sensor 112c is located at cooling air valve 106a/106b and monitors the position of cooling air valve 106a/106b. Third position sensor 112e communicates with controller 104 and tells controller 104 if cooling air valve 106a/106b is open or closed.

Pressure sensor 112a, temperature sensor 112b, first position sensor 112c, second position sensor 112d, and third position sensor 112e all work together in real time to tell controller 104 whether the components of intercooled cooling system 60 are in the correct position at the correct time. If any of the sensors of monitoring system 112 detect a position error, controller 104 can take action, or send instructions for action, to mitigate thermal damage to intercooled cooling system 60 and gas turbine engine 20.

During operation of gas turbine engine 20 (shown in FIG. 1), intercooled cooling system 60 is activated when gas turbine engine 20 requires additional cooling, such as when gas turbine engine 20 is undergoing takeoff and climb. To activate intercooled cooling system 60, controller 104 first opens both cooling air valve 106a/106b and shut off valve 82. Before powering up cooling compressor 84, controller 104 verifies that cooling air valve 106a/106b and shut off valve 82 are both open via first position sensor 112c and third position sensor 112e. After verifying that a valve or both valves 82, 106a/106b are open, controller 104 applies power to cooling compressor 84 by moving clutch 96 to the closed position. Cooling compressor 84 is only ever powered after cooling air valve 106a/106b and shut off valve 82 are opened. Second position sensor 112d verifies that clutch 96 is closed and that cooling compressor 84 has power. Pressure sensor 112a and temperature sensor 112b also verify that cooling compressor 84 has power and is supplying conditioned air to mixing chamber 88 at the correct pressure and temperature.

After gas turbine engine 20 has finished climbing and has reached low power and engine temperatures at cruise, controller 104 deactivates intercooled cooling system 60 to conserve fuel by improving engine efficiency by not running cooling compressor 84 and extracting its horsepower from the overall engine cycle of gas turbine engine 20. Controller 104 deactivates intercooled cooling system 60 first by cutting power to clutch 96 and cooling compressor 84. Shut down of cooling compressor 84 is verified to controller 104 by pressure sensor 112a (which detects decreased pressure in mixing chamber 88), by temperature sensor 112b (which detects increased temperature in mixing chamber 88), and by second position sensor 112*d* (which detects the position of clutch 96). Next, controller 104 closes cooling air valve 106*a*/106*b* and shut off valve 82. Controller 104 will only close cooling air valve 106*a*/106*b* and shut off valve 82 after verification that cooling compressor 84 is powered-off. During cruise, second tap 90 fills mixing chamber 88 with air at temperature T3 and pressure P3, which is sufficient to cool high pressure turbine 54 at the lower operating conditions of cruise.

Should an error occur in intercooled cooling system 60, monitoring system 112 will detect the error and controller 104 can take mitigating action or send an alert for mitigating action. For example, if cooling air valve 106*a*/106*b* is supposed to be open but suddenly shuts during takeoff or climb and cuts off cooling air CF to heat exchanger 78, third position sensor 112*e* and/or temperature sensor 112*b* will detect the position error, and controller 104 can send an alert to reduce or stop engine power to reduce the likelihood of thermal damage to gas turbine engine 20. Controller 104 can also set a maintenance flag that cooling air valve 106*a*/106*b* requires repair.

In another example, if the same error occurs in cooling air valve 106*a*/106*b*, but gas turbine engine 20 is at engine start or idling on the ground, controller 104 can send an alert after detection of the error and cooling air valve 106*a*/106*b* can be manually locked open so gas turbine engine 20 can operate at full power until cooling air valve 106*a*/106*b* can be repaired.

In yet another example, if gas turbine engine 20 is at takeoff or climb and shut off valve 82 suddenly shuts when shut off valve 82 is supposed to be open and allowing air to flow from heat exchanger 78 to cooling compressor 84, monitoring system 112 will detect the position error via first position sensor 112*c*, pressure sensor 112*a*, and temperature sensor 112*b*, and controller 104 will immediately cut power to clutch 96 and cooling compressor 84 to mitigate damage to cooling compressor 84. Controller 104 will also send an alert to reduce engine power to mitigate thermal damage to gas turbine engine 20. Controller 104 can also be configured to automatically throttle down the power to gas turbine engine 20 to an acceptable level. Controller 104 can also set a maintenance flag to indicate that shut off valve 82 requires repair. If gas turbine engine 20 is on the ground when a position error is detected in shut off valve 82, controller 104 can send an alert and shut off valve 82 can be manually locked open so gas turbine engine 20 and intercooled cooling system 60 can operate at full power until shut off valve 82 is repaired.

In another example, if controller 104 is attempting to power down intercooled cooling system 60 (such as when gas turbine engine 20 is operating at cruise and does not require boosted cooling) and second position sensor 112*d*, pressure sensor 112*a*, and/or temperature sensor 112*b* detect that clutch 96 will not move to the open position, controller 104 can send an alert and lock open both cooling air valve 106*a*/106*b* and shut off valve 82 so that cooling compressor can continue to receive cooler air from heat exchanger 78 and avoid overheating. Controller 104 can set a maintenance flag indicating that clutch 96 requires repair and intercooled cooling system 60 continues to provide boosted cooling air throughout the flight. If gas turbine engine 20 is undergoing climb and clutch 96 fails to the open position (thereby cutting off power to cooling compressor 84), second position sensor 112*d*, pressure sensor 112*a*, and/or temperature sensor 112*b* will detect the failure and controller 104 can shut cooling air valve 106*a*/106*b* and shut off valve 82 to improve engine efficiency, and controller 104 can send an alert to reduce engine power (or controller can automatically throttle down engine power) to protect gas turbine engine 20 from thermal damage.

Figure 3A:
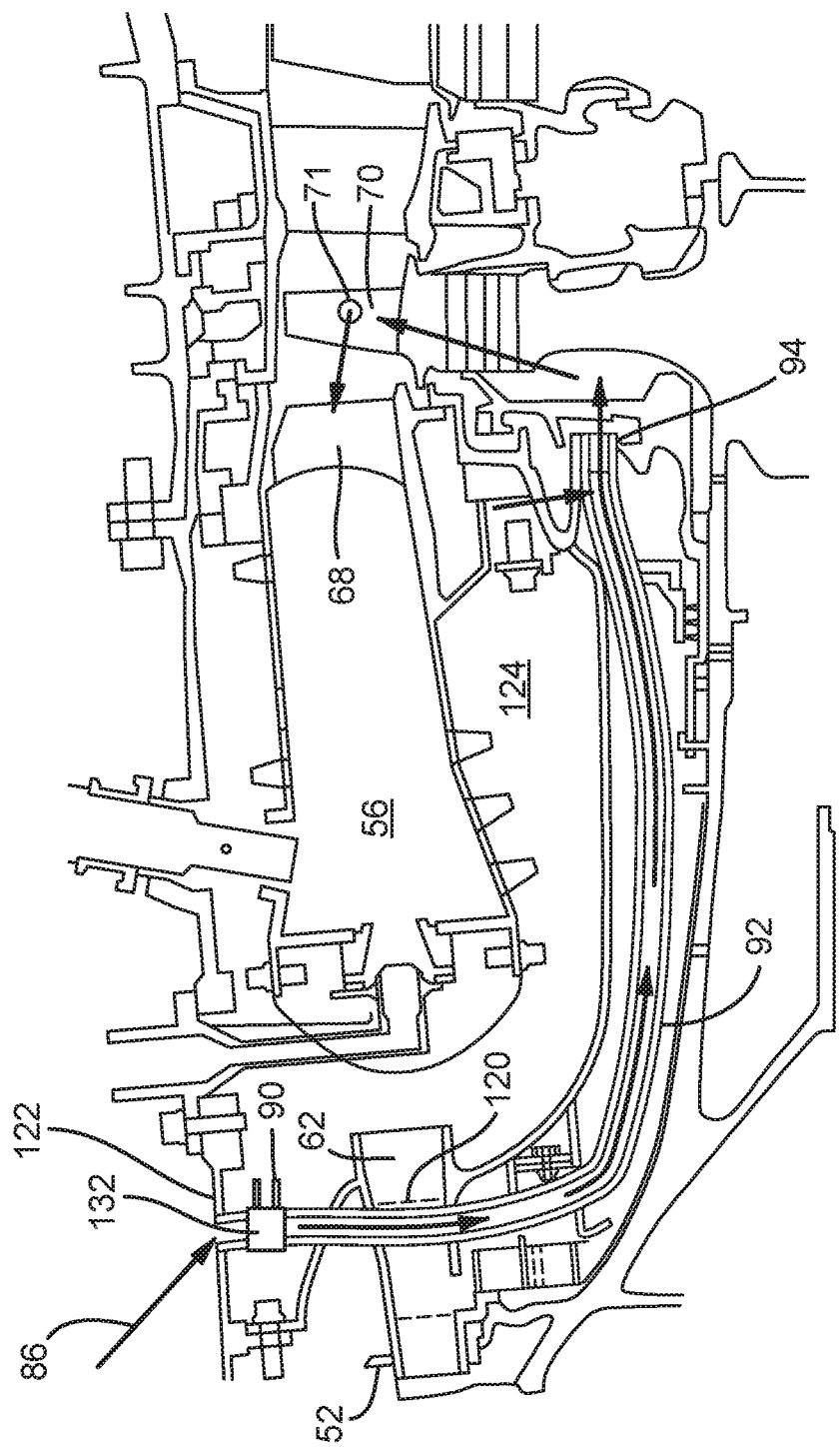
FIG. 3A is an enlarged view of the diffuser case, the TOBI, and the high pressure turbine section with the mixing chamber of the intercooled cooling system in FIG. 2B replaced by a valve.
Figure 3B:
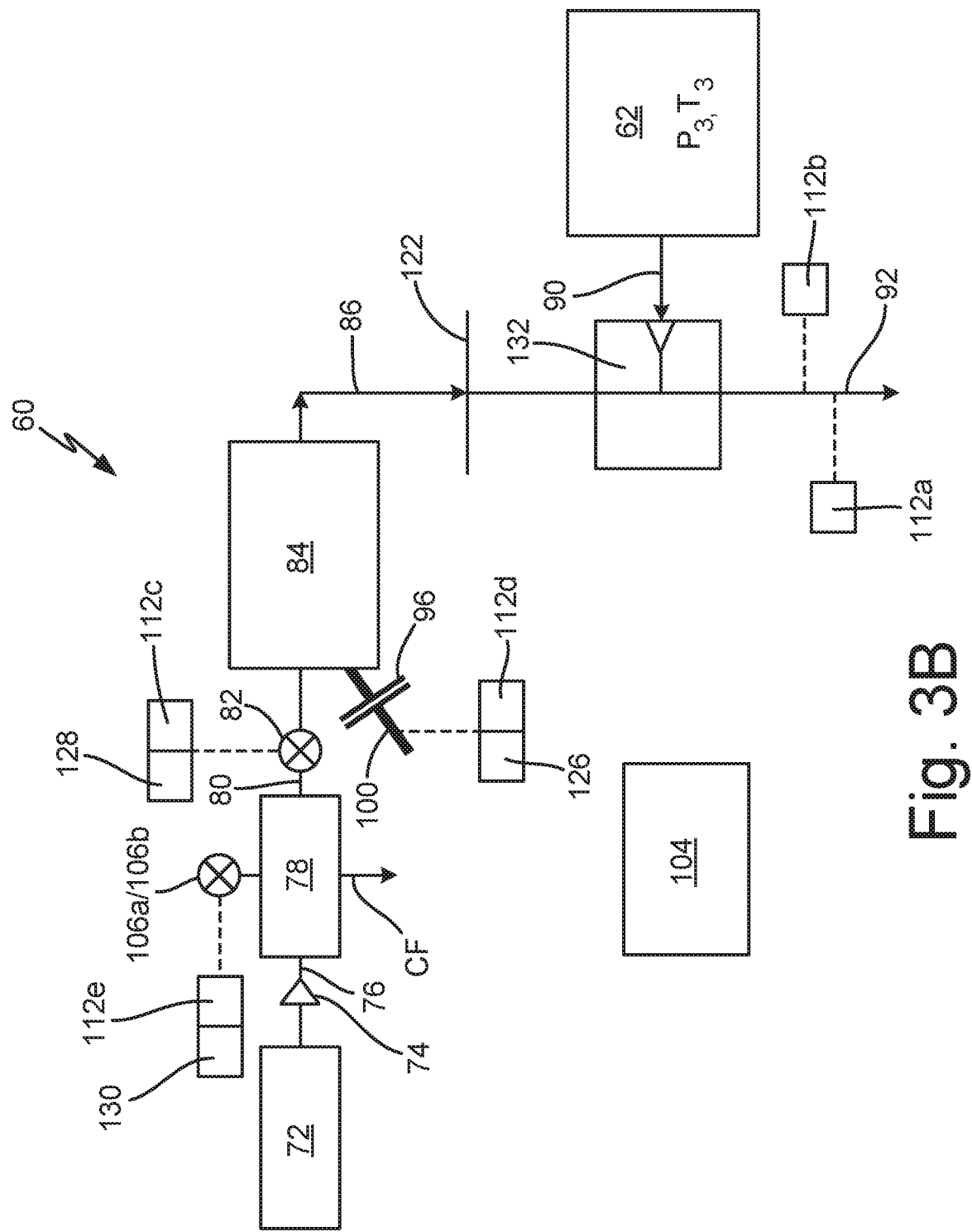
FIG. 3B is a schematic diagram of another embodiment of the intercooled cooling system that includes the valve from FIG. 3A.

FIGS. 3A and 3B will be discussed concurrently. FIGS. 3A and 3B show an alternative embodiment of intercooled cooling system 60. In the alternative embodiment, mixing chamber 88 is eliminated. Rather, the airflow 86 from cooling compressor 84 is directed through valve 132, then directed to turbine blades 70 and vanes 68 via passage 92 and TOBI 94. Valve 132 prevents air at pressure $P_3$ from entering passage 92 so long as cooling compressor 84 is powered and providing boosted conditioned air. In this configuration, cooling compressor 84 can be larger and can provide conditioned air at a significantly higher pressure than the embodiment of FIGS. 2A-2C because valve 132 blocks conditioned air from cooling compressor 84 from bleeding into diffuser 62 and high pressure compressor 52. When cooling compressor 84 is powered down, the pressure drops in valve 132 and air at pressure $P_3$ can pass through second tap 90, into valve 132, and into passage 92 to cool turbine blades 70 and vanes 68 at temperature $T_3$. Controller 104 and monitoring system 112 are configured in similar fashion in FIGS. 3A and 3B to the embodiment of FIGS. 2A-2C.

The following are non-exclusive descriptions of possible embodiments of the present invention.

In one embodiment, a gas turbine engine includes a plurality of rotating components housed within a main compressor section and a turbine section. A first tap is connected to the main compressor section and is configured to deliver air at a first pressure. A heat exchanger is connected downstream of the first tap. A bypass air valve is configured to selectively block flow of bypass air across the heat exchanger, wherein the bypass air is lower in temperature and pressure than the air from the first tap at the first pressure. A cooling compressor is connected downstream of the heat exchanger and is configured to pressurize the air from the first tap to a second pressure that is greater than the first pressure. A shut off valve is configured to selectively stop flow of the air through the heat exchanger and the cooling compressor. A controller is configured to modulate and stop flow between the heat exchanger and the plurality of rotating components under certain power conditions of the gas turbine engine. The controller is programmed to control the bypass air valve, the shut off valve, and the cooling compressor such that the flow of the air is stopped between the heat exchanger and the cooling compressor only after the controller has stopped the cooling compressor. A monitoring system is in communication with the controller and includes at least one of a pressure sensor downstream of the cooling compressor, and a temperature sensor downstream of the cooling compressor.

The gas turbine engine of the preceding paragraph can optionally include, additionally and/or alternatively, any one or more of the following features, configurations and/or additional components:

a mixing chamber connected downstream of the cooling compressor, wherein the mixing chamber is configured to deliver air to at least one of the plurality of rotating components; and a second tap configured to deliver air at a third pressure that is higher than the first pressure and is less than or equal to the second pressure, wherein the second tap delivers the air at the third pressure to the mixing chamber;

the air from the second tap at the third pressure is higher in temperature than the air at the second pressure;

a flow passage connected downstream of the cooling compressor, wherein the flow passage is configured to deliver air to at least one of the plurality of rotating components; a second tap configured to deliver air at a third pressure that is higher than the first pressure and is less than the second pressure; and a check valve connecting the second tap to the flow passage;

the monitoring system further comprises: a first position sensor at the bypass air valve and configured to detect when the bypass air valve is open and when the bypass air valve is shut; and a second position sensor at the shut off valve and configured to detect when the shut off valve is open and when the shut off valve is shut;

a clutch configured to mechanically connect and disconnect the cooling compressor to a drive input, wherein the controller operates the clutch;

the monitoring system further comprises: a third position sensor at the clutch and configured to detect when the clutch is in an engaged position and when the clutch is in a dis-engaged position;

a method for operating the controller and the monitoring system, the method comprising: detecting a position error in the bypass air valve via the first position sensor and/or the temperature sensor; sending an alert of the position error via the controller; manually locking the bypass air valve into an open position at engine start if the gas turbine engine is on the ground; reducing or stopping engine power if the gas turbine engine is at takeoff and the bypass air valve is unexpectedly closed; and setting a maintenance flag;

a method for operating the controller and the monitoring system, the method comprising: detecting a position error in the shut off valve via the second position sensor, the temperature sensor, and/or the pressure sensor; sending an alert of the position error via the controller; manually locking the shut off valve into an open position at engine start if the gas turbine engine is on the ground and proceeding with normal operation of the cooling compressor; reducing or stopping engine power if the gas turbine engine is at takeoff and the shut off valve is unexpectedly closed; disconnecting the clutch from the drive input to turn off the cooling compressor if the gas turbine engine is at takeoff and the shut off valve is unexpectedly closed; and setting a maintenance flag;

a method for operating the controller and the monitoring system, the method comprising: detecting a position error in the clutch via the third position sensor, the temperature sensor, and/or the pressure sensor; sending an alert of the position error via the controller; maintaining both the bypass air valve and the shut off valve open if the clutch is turning the cooling compressor; and setting a maintenance flag;

a check valve is placed on the first tap between the main compressor section and the heat exchanger;

the heat exchanger is within a chamber defined between an outer core housing and an inner housing that is radially inward of a bypass duct;

the bypass air valve is positioned at an upstream end of the chamber; and/or the bypass air valve is positioned at a location downstream of the heat exchanger.

In another embodiment, a gas turbine engine includes a plurality of rotating components housed within a main compressor section and a turbine section. A first tap is connected to the main compressor section and is configured to deliver air at a first pressure. A heat exchanger is connected downstream of the first tap. A cooling air valve is configured to selectively block flow of cooling air across the heat exchanger. A cooling compressor is connected downstream of the heat exchanger and is configured to pressurize the air from the first tap to a second pressure that is greater than the first pressure. A shut off valve is configured to selectively stop flow of the air between the heat exchanger and the cooling compressor. A controller is configured and programmed to control the cooling air valve, the shut off valve, and the cooling compressor such that the flow of the air is intentionally stopped between the heat exchanger and the cooling compressor only after the controller has stopped the cooling compressor. A monitoring system is in communication with the controller and includes a pressure sensor downstream of the cooling compressor, and a temperature sensor downstream of the cooling compressor.

The gas turbine engine of the preceding paragraph can optionally include, additionally and/or alternatively, any one or more of the following features, configurations and/or additional components:

a mixing chamber connected downstream of the cooling compressor, wherein the mixing chamber is configured to deliver air to at least one of the plurality of rotating components; and a second tap configured to deliver air at a third pressure that is higher than the first pressure and is less than or equal to the second pressure, wherein the second tap delivers the air at the third pressure to the mixing chamber;

a flow passage connected downstream of the cooling compressor, wherein the flow passage is configured to deliver air to at least one of the plurality of rotating components; a second tap configured to deliver air at a third pressure that is higher than the first pressure and is less than the second pressure; and a check valve connecting the second tap to the flow passage;

the cooling air valve is configured to default to an open position when the cooling air valve loses power, and wherein the shut off valve is configured to default to an open position when the shut off valve loses power; and/or a clutch configured to mechanically connect and disconnect the cooling compressor to a drive input, wherein the controller operates the clutch, and wherein the clutch is configured to disconnect the cooling compressor from the drive input when the clutch loses power.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while the embodiments of FIGS. 2C and 3B show monitoring system 112 as having a single pressure sensor 112a and a single temperature sensor 112b, monitoring system 112 can have redundant pressure sensors and temperature sensors in case pressure sensor 112a or temperature sensor 112b should fail. Monitoring system 112 can also have redundancies for all of the positions sensors. In addition, many modifications may be made to adapt a particular situation or material to the teachings of the invention without departing from the essential scope thereof. For example, while the embodiments of FIGS. 2A-3B show intercooled cooling system 60 as having a single shut off valve 82 and a single cooling air valve 102a/102b, intercooled cooling system 60 can include at least one backup valve for shut off valve 82 and at least one backup valve for cooling air valve 102a/102b. These backup valves can allow intercooled cooling system 60 to function uninterrupted even if one of valves 82, 102a/102b fails during engine climb. Therefore, it is intended that the invention not be limited to the particular embodiment(s) disclosed, but that the invention will include all embodiments falling within the scope of the appended claims.

The invention claimed is:

1. A gas turbine engine comprising:
   a plurality of rotating components housed within a main compressor section and a turbine section;
   a first tap connected to the main compressor section and configured to deliver air at a first pressure;
   a heat exchanger connected downstream of the first tap;
   a bypass air valve configured to selectively block flow of bypass air across the heat exchanger, wherein the bypass air is lower in temperature and pressure than the air from the first tap at the first pressure;
   a cooling compressor connected downstream of the heat exchanger and configured to pressurize the air from the first tap to a second pressure that is greater than the first pressure;
   a shut off valve configured to selectively stop flow of the air through the heat exchanger and the cooling compressor;
   a controller configured to modulate and stop flow between the heat exchanger and the plurality of rotating components under certain power conditions of the gas turbine engine, the controller being programmed to control the bypass air valve, the shut off valve, and the cooling compressor such that the flow of the air is stopped between the heat exchanger and the cooling compressor only after the controller has stopped the cooling compressor; and
   a monitoring system in communication with the controller, wherein the monitoring system comprises at least one of:
      a pressure sensor downstream of the cooling compressor; and
      a temperature sensor downstream of the cooling compressor.

2. The gas turbine engine of claim 1, wherein the gas turbine engine further comprises:
   a mixing chamber connected downstream of the cooling compressor, wherein the mixing chamber is configured to deliver air to at least one of the plurality of rotating components; and
   a second tap configured to deliver air at a third pressure that is higher than the first pressure and is less than or equal to the second pressure, wherein the second tap delivers the air at the third pressure to the mixing chamber.

3. The gas turbine engine of claim 2, wherein the air from the second tap at the third pressure is higher in temperature than the air at the second pressure.

4. The gas turbine engine of claim 1, wherein the gas turbine engine further comprises:
   a flow passage connected downstream of the cooling compressor, wherein the flow passage is configured to deliver air to at least one of the plurality of rotating components;
   a second tap configured to deliver air at a third pressure that is higher than the first pressure and is less than the second pressure; and
   a check valve connecting the second tap to the flow passage.

5. The gas turbine engine of claim 1, wherein the monitoring system further comprises:
   a first position sensor at the bypass air valve and configured to detect when the bypass air valve is open and when the bypass air valve is shut; and
   a second position sensor at the shut off valve and configured to detect when the shut off valve is open and when the shut off valve is shut.

6. The gas turbine engine of claim 5, wherein the gas turbine engine further comprises:
   a clutch configured to mechanically connect and disconnect the cooling compressor to a drive input, wherein the controller operates the clutch.

7. The gas turbine engine of claim 6, wherein the monitoring system further comprises: a third position sensor at the clutch and configured to detect when the clutch is in an engaged position and when the clutch is in a dis-engaged position.

8. A method for operating the controller and the monitoring system of claim 7, the method comprising:
   detecting a position error in the bypass air valve via the first position sensor and/or the temperature sensor;
   sending an alert of the position error via the controller;
   manually locking the bypass air valve into an open position at engine start if the gas turbine engine is on the ground;
   reducing or stopping engine power if the gas turbine engine is at takeoff and the bypass air valve is unexpectedly closed; and
   setting a maintenance flag.

9. A method for operating the controller and the monitoring system of claim 7, the method comprising:
   detecting a position error in the shut off valve via the second position sensor, the temperature sensor, and/or the pressure sensor;
   sending an alert of the position error via the controller;
   manually locking the shut off valve into an open position at engine start if the gas turbine engine is on the ground and proceeding with normal operation of the cooling compressor;
   reducing or stopping engine power if the gas turbine engine is at takeoff and the shut off valve is unexpectedly closed;
   disconnecting the clutch from the drive input to turn off the cooling compressor if the gas turbine engine is at takeoff and the shut off valve is unexpectedly closed; and
   setting a maintenance flag.

10. A method for operating the controller and the monitoring system of claim 7, the method comprising:
    detecting a position error in the clutch via the third position sensor, the temperature sensor, and/or the pressure sensor;
    sending an alert of the position error via the controller;
    maintaining both the bypass air valve and the shut off valve open if the clutch is turning the cooling compressor; and
    setting a maintenance flag.

11. The gas turbine engine of claim 1, wherein a check valve is placed on the first tap between the main compressor section and the heat exchanger.

12. The gas turbine engine of claim 1, wherein the heat exchanger is within a chamber defined between an outer core housing and an inner housing that is radially inward of a bypass duct.

13. The gas turbine engine of claim 12, wherein the bypass air valve is positioned at an upstream end of the chamber.

14. The gas turbine engine of claim 12, wherein the bypass air valve is positioned at a location downstream of the heat exchanger.

15. A gas turbine engine comprising:
- a plurality of rotating components housed within a main compressor section and a turbine section;
- a first tap connected to the main compressor section and configured to deliver air at a first pressure;
- a heat exchanger connected downstream of the first tap;
- a cooling air valve configured to selectively block flow of cooling air across the heat exchanger;
- a cooling compressor connected downstream of the heat exchanger and configured to pressurize the air from the first tap to a second pressure that is greater than the first pressure;
- a shut off valve configured to selectively stop flow of the air between the heat exchanger and the cooling compressor;
- a controller configured and programmed to control the cooling air valve, the shut off valve, and the cooling compressor such that the flow of the air is intentionally stopped between the heat exchanger and the cooling compressor only after the controller has stopped the cooling compressor; and
- a monitoring system in communication with the controller, wherein the monitoring system comprises:
  - a pressure sensor downstream of the cooling compressor; and
  - a temperature sensor downstream of the cooling compressor.

16. The gas turbine engine of claim 15, wherein the gas turbine engine further comprises:
- a mixing chamber connected downstream of the cooling compressor, wherein the mixing chamber is configured to deliver air to at least one of the plurality of rotating components; and
- a second tap configured to deliver air at a third pressure that is higher than the first pressure and is less than or equal to the second pressure, wherein the second tap delivers the air at the third pressure to the mixing chamber.

17. The gas turbine engine of claim 15, wherein the gas turbine engine further comprises:
- a flow passage connected downstream of the cooling compressor, wherein the flow passage is configured to deliver air to at least one of the plurality of rotating components;
- a second tap configured to deliver air at a third pressure that is higher than the first pressure and is less than the second pressure; and
- a check valve connecting the second tap to the flow passage.

18. The gas turbine engine of claim 15, wherein the cooling air valve is configured to default to an open position when the cooling air valve loses power, and wherein the shut off valve is configured to default to an open position when the shut off valve loses power.

19. The gas turbine engine of claim 18, wherein the gas turbine engine further comprises:
- a clutch configured to mechanically connect and disconnect the cooling compressor to a drive input, wherein the controller operates the clutch, and wherein the clutch is configured to disconnect the cooling compressor from the drive input when the clutch loses power.

* * * * *

UNITED STATES PATENT AND TRADEMARK OFFICE
CERTIFICATE OF CORRECTION

PATENT NO. : 10,815,889 B2
APPLICATION NO. : 16/027787
DATED : October 27, 2020
INVENTOR(S) : Frederick M. Schwarz and Jorn Axel Glahn Page 1 of 1

It is certified that error appears in the above-identified patent and that said Letters Patent is hereby corrected as shown below:

In the Specification

Column 8, Line 23:
Delete "112c"
Insert --112e--

Signed and Sealed this
Eighth Day of December, 2020

Andrei Iancu
*Director of the United States Patent and Trademark Office*